Nov. 24, 1931.  A. E. PEW, JR  1,833,619
PROCESS OF DEHYDRATING AND PURIFYING OIL
Filed April 4, 1929
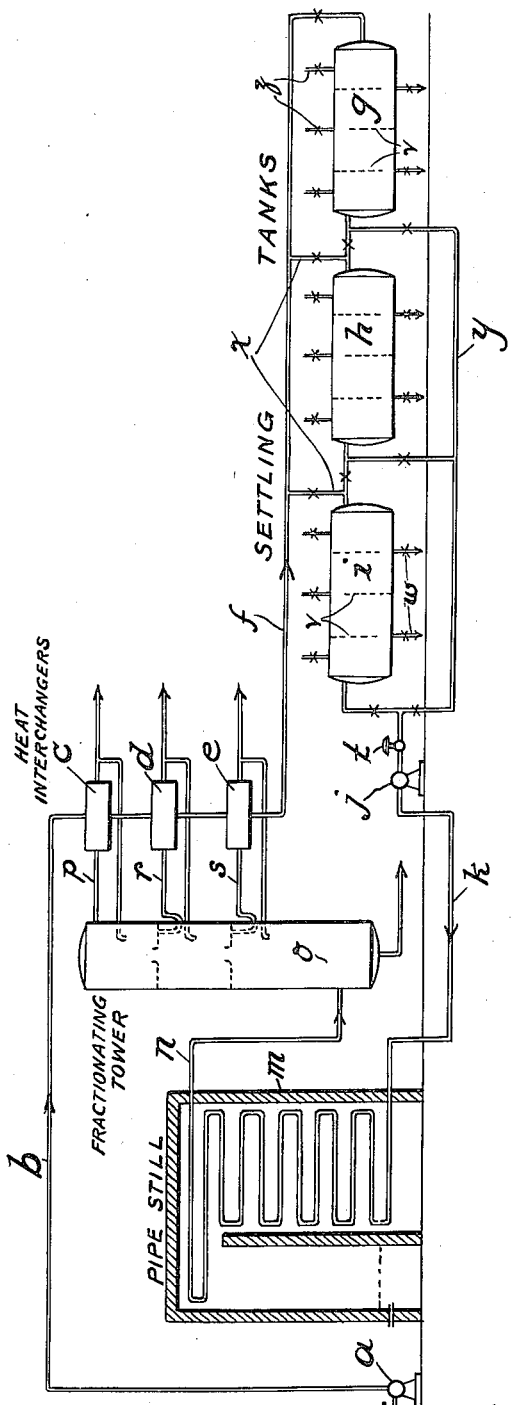
INVENTOR
Arthur E. Pew, Jr.
BY
Busser and Harding
ATTORNEYS.
WITNESS:

Patented Nov. 24, 1931

1,833,619

UNITED STATES PATENT OFFICE

ARTHUR E. PEW, JR., OF BRYN MAWR, PENNSYLVANIA, ASSIGNOR TO SUN OIL COMPANY, OF PHILADELPHIA, PENNSYLVANIA, A CORPORATION OF NEW JERSEY

PROCESS OF DEHYDRATING AND PURIFYING OIL

Application filed April 4, 1929. Serial No. 352,393.

Crude oil, as it is produced from many fields, contains water, salt water, sand and dirt, free and in emulsion, commonly known as "B. S." or "bottom settlings." Such oil is not generally acceptable to operators of pipe lines or to other purchasing agencies unless the "B. S." and water are reduced to less than two per cent.

Crude oil containing salt water and sediment is a source of great trouble in refining processes, as the dirt plugs up the tubes of heat exchangers and pipe stills and also causes the bottom plates of cylindrical stills to get dirty, resulting in hot spots and carbon accumulations which eventually cause the steel to burn out, necessitating the installation of new plates or tubes. Corrosion, in many cases, is directly traceable to chlorine, formed in breaking up the salt water, combining with the condensed water to form diluted hydrochloric acid. These contaminating constituents of crude oil cause great expense to refineries and are the direct cause of many shutdowns of plants for cleaning and repairs. The conditions just mentioned are well known to be so serious as to render it uneconomical to run certain crudes (as, for example, South Texas heavy crudes and crudes from the Texas panhandle) in pipe stills.

With a view to conditioning crude oil for refining operations, it is customary to treat the crude with chemicals before shipment, or to heat it, or "cook" it, with steam for the purpose of evaporating the water. Chemical treatment, although partially successful, is expensive and does not produce a satisfactory result, particularly in removing dirt, and many authorities assert that treatment with chemicals has a deleterious effect on products subsequently obtained from the crude thus treated. "Cooking" is extravagant, in that it involves loss of light oil vapors, and it is injurious in that it effects oxidation of the crude because of the effect thereon of air at temperature necessary for dehydration, the oxidation causing poor colors to be obtained in the lubricating oil distillates of subsequent distillation. Another defect of the steaming or cooking procedure consists in the fact that the evaporation of the water content causes a concentration of salt from the salt water, which salt is substantially insoluble in the oil and thus later acts as above described in subsequent distillation.

Other methods for purifying crude oil, such as centrifuging, have been tried. Centrifuging removes dirt but is not successful in removing water to a satisfactory extent. Experimental centrifugal operations indicate that dehydration is effected, wholly or in large part, by such aeration of the crude as occurs in the necessary heating thereof prior to centrifugation. A practical objection to the centrifugal method of purification is that, unless an economically impracticable number of centrifugals are employed, it is impossible to treat large volumes of crude.

Oil has also been dehydrated by running it through a large tube, heating the oil in the course of its flow therethrough so as to vaporize the water and the more volatile constituents of the oil, condensing the oil and water vapors and separating the oil and water by gravity. In such a process, however, the chlorides are deposited in the oil and settle out in the still, necessitating frequent shutdowns for cleaning and shortening the life of the still.

It is also known to heat the oil under pressure in a tank and then cool, in the same tank, to ordinary atmospheric temperature and to then run the oil into a separate tank wherein the oil and water settle by gravity. But this process, besides being non-continuous, destroys the low viscosity which may have been previously secured and thereby destroys the conditions required for efficient settlement.

In an application filed by me June 14, 1927, Serial No. 198,763, I disclose a process of dehydrating and removing sediment from crude oil or from any oil which contains water and other impurities, which overcomes all the objections to older processes. The process comprises heating the oil to a temperature sufficient to reduce its viscosity to not above 35 seconds Saybolt while subjecting it to superatmospheric pressure sufficient to prevent substantial vaporization of water and light oil fractions and, while maintaining substantially the same pressure and without allowing the temperature to materially fall so as to increase the viscosity above that specified, allowing the water and sediment to precipitate; the water and sediment, and the oil, being separately withdrawn. In the specific embodiment of the invention disclosed in said application, the oil is preferably heated while flowing toward the settling tank, heat not being applied directly to the oil in the settling tank. In said specific embodiment, three settling tanks are employed, the oil flowing into one tank while it is settling in another tank and while the water and oil are being withdrawn from the third tank, these three operations occurring, also, successively in each tank.

The specific process disclosed in my said application is particularly applicable to dehydrating oil in the field, where there is no distilling system to furnish the required heat.

The present invention embodies the invention set forth in my application so far as concerns heating and settling under the specified temperature and pressure conditions, and so far also as concerns heating in one locus and settling in another. The specific object of the present invention is to adapt the process to use in connection with a refining plant and to carry on the settling process continuously, as distinguished from settlement in batch or in stages and without the necessity of manipulating oil-flow valves or of overseeing the operation except in a most general way.

In the drawing is shown a diagram of an oil refining plant associated with an oil dehydrating and purifying apparatus, in which my improved process is adapted to be carried out.

From a source of supply of crude oil a pump $a$ forces oil through a line $b$, heat exchangers $c$, $d$ and $e$, line $f$, and separating tanks $g$, $h$ and $i$. In the course of flow of the oil through the separating tanks, the water and sediment settle to the bottom and are withdrawn from the tanks from time to time. Pump $j$ then forces the dehydrated and purified oil through a line $k$ and a pipe still $m$, in which the oil is heated to the temperature required to vaporize the desired fractions. The oil and oil vapors flow through line $n$ to a fractionating tower $o$. Vapors that are uncondensed in the tower escape through line $p$ and flow through a condenser (heat exchanger) $c$ and initially heat the crude oil entering the exchanger from line $b$. Light condensed oil escapes from the bottom of the upper zone of the tower and flows through line $r$ and cooler (heat exchanger) $d$ and imparts additional heat to the flowing stream of crude oil. Heavier oil condensate escapes from the bottom of the next lower zone of the tower and flows through line $s$ and cooler (heat exchanger) $e$ and imparts still more heat to the flowing crude. The tower may have any practicable number of heating zones and may have any known internal construction.

On the line $k$, at or beyond the outlet from separating tank $i$, is a pressure regulating valve $t$ which maintains a pressure in the tank and in the crude oil flow line through the heating zone at least as high as, and preferably higher than, the vapor pressure in corresponding relation to the temperature. The heat exchangers and heater are of such capacity as will enable the oil to be heated to such a temperature as will reduce the viscosity to at least 35 seconds Saybolt. The establishment of these conditions will ordinarily require a temperature of from 250° to 350° F. and a pressure of from three to ten atmospheres; but temperature pressures and time of settlement may be varied within rather wide ranges, dependent on the character of the crude or other oil that is to be dehydrated and purified. For example, in treating grade "A" Texas crude, with a temperature of 310° F., a pressure of 75 pounds absolute and one hour's settlement, the treated oil shows substantially no water or salt and the ash content shows the substantial removal of sand and foreign matter. In treating Spindle Top crude, a temperature of 280° F. and a pressure of 65 pounds absolute, with fifty minutes settling, effects satisfactory results. As another example, if the desired or required temperature is 325° F., the pressure should be about 100 pounds absolute. The principal reason for the desirable variation in these necessary factors is that different crudes contain varying percentages of water and "B. S." and are of different viscosities.

In the execution of the process it is important, and indeed necessary, that vaporization of water or light oil fractions, before or during settlement, shall be prevented, and that the settlement should be effected while the oil remains heated substantially above the temperature at which water vaporizes freely at atmospheric pressure.

The dimensions of tanks $g$, $h$ and $i$ will vary, of course, with the desired capacity of the refining plant. Assuming that three hundred barrels of crude oil per hour are run through the plant, each tank may have a length of about 32 feet and a diameter of about 9 feet. The tanks are provided with baffles $v$ to change the course of the oil as it flows through the tank. The tanks are so dimensioned as to give a very low velocity flow as well as the necessary time element. As the oil changes its course, due to the baffles, water settles out because of the difference in gravity and the loss of momentum. Water and sediment are drawn off through the bottom valved outlets $w$.

The described process of oil dehydration and purification is of especial value when the same is employed in connection with a pipe still of the character diagrammed in the drawing. Without the use of the process disclosed in my prior application and in this application, the stills will operate only about three days without cleaning, because of the high rate of deposition of salts and sand in the tubes. The corrosion rate on the stills is very high when not using my process due to the decomposition of chlorides and other salts caused by the temperatures encountered, with the consequent result that the life of the still and condensers is materially shortened. With the use of my process the still can be run for thirty days without cleaning and the life of the still and condensers is greatly prolonged. Due to the removal of sediment, it is possible, in running asphalt base oil, to get low ash tests on the residual asphalt.

In case there should be a supersaturated solution of salt and water in the oil to be purified, the salt would not be entirely eliminated from the treated oil flowing from the treating tanks. Such supersaturated salt water would result from cooking the crude oil before shipping it to the refinery. In order to effect the complete removal of salt from such cooked oil, my process contemplates, as a permissible modification, and as an initial step in the treatment of cooked oil, the addition to the oil of water in sufficient volume to take into solution the excess salt, thereby enabling the practically complete removal of the salt as well as of the water.

In a continuous process it is entirely practicable to use a single relatively large tank in place of the three tanks shown in the drawing. It is also possible to use any number of tanks. An advantage in the use of three or more tanks is that they may be equipped with connections that will enable them to be operated in multiple, in the manner fully described in my said application. In the drawing a system of pipes $x$ for inflow of oil in multiple to the tanks and a system of pipes $y$ for outflow of oil in multiple from the tanks is shown. The pipes are equipped with valves so positioned as to enable the tanks to be run in series or multiple, as may be desired. The tanks are also equipped with vent lines $z$ to allow the air to escape from the different compartments when charging the tanks.

The separating tanks, flow lines and heat exchangers should be heavily insulated. The only loss of heat in the process is that slight loss due to radiation and to the heat contained in the drawn off water.

While the process has all the advantages characterizing the process set forth in my prior application, it has important additional advantages, among which may be mentioned the capacity for continuous operation, enabling it to be combined with a continuous refining plant so as to make the whole process continuous from beginning to end; the avoidance of any necessity for providing a special heater after the refining plant is once in operation, since all the heat required from the process may be derived from the condensation of oil vapors and the cooling of oil distillates; and the avoidance of any necessity of manipulating any oil flow valves when the tanks are used in series.

Having now fully described my invention, what I claim and desire to protect by Letters Patent is:

1. The process of continuously dehydrating and purifying oil which comprises flowing the oil substantially continuously toward a locus of settling and in the course of its flow subjecting it to heat sufficient to reduce its viscosity to not above 35 seconds Saybolt and to a superatmospheric pressure sufficient to prevent substantial vaporization of water and light oil fractions and while continuing to maintain the oil at the temperature required to maintain such low viscosity and under the superatmospheric pressure required to prevent substantial vaporization of water and light oil fractions, flowing the oil substantially continuously but with reduced velocity in a general horizontal direction through a series of settling loci in which settle successive fractions of the water and sediment and from which oil successively overflows, thereby avoiding the flow of partly dehydrated oil through previously separated water, removing the water at intervals from the different settling loci and discharging the dehydrated and purified oil substantially continuously from the final locus of settlement.

2. The process of continuously dehydrating and purifying oil which comprises flowing the oil, in an elongated stream of narrow cross-section, continuously through a heating zone at a relatively high velocity and therein subjecting it to heat sufficient to reduce its viscosity to not above 35 seconds Saybolt and to a superatmospheric pressure sufficient to prevent substantial vaporization of water and light oil fractions and, while continuing to maintain the oil at the temperature required to maintain such low viscosity and under the superatmospheric pressure required to prevent substantial vaporization of water and light oil fractions, flowing the oil substantially continuously in a general horizontal direction through horizontally disposed, vertically baffled, a plurality of settling loci at a velocity so greatly reduced as to effect settlement of water and sediment while the oil continues to flow through said loci above the settled water and sediment, removing the water at intervals from the different settling loci and discharging the dehydrated and purified oil substantially continuously from the final locus of settlement.

In testimony of which invention, I have hereunto set my hand, at Marcus Hook, Pennsylvania, on this 2nd day of April, 1929.

ARTHUR E. PEW, Jr.